3,075,936
SURFACE COATING COMPOSITION OF A RESIN-POLYESTER MIXTURE
Benjamin A. Bolton, Gary, Ind., assignor to Standard Oil Company, Chicago, Ill., a corporation of Indiana
No Drawing. Filed Mar. 30, 1960, Ser. No. 18,517
11 Claims. (Cl. 260—29.6)

This invention relates to surface coating compositions of the latex emulsion type.

The surface coating composition of the invention is formed of water, a water-soluble baking resin consisting of the polyester condensation reaction product of benzene tricarboxylic acid or anhydride and of aliphatic dicarboxylic acid containing at least 4 carbon atoms and aliphatic polyol reacted with an alkaline substance to obtain water solubility, and a dispersed plastic semi-solid capable of forming a latex emulsion.

Water Soluble Resin Component

The resin polyester condensation reaction product is prepared by condensing an aliphatic polyol, an aliphatic dicarboxylic acid containing at least 4 carbon atoms, and a benzene tricarboxylic acid at elevated temperatures, for example, about 300°–400° F., while continuously removing the water formed in the reaction. The polyester condensation reaction is well known and it is not necessary to describe it in detail herein.

The benzene tricarboxylic acids and anhydrides may also be described as acidic members selected from the class consisting of benzene tricarboxylic acids containing, as the only substituents, 3 carboxyl groups, and anhydrides thereof. The individual members of the defined class are trimellitic acid, trimellitic anhydride, trimesic acid, hemimellitic acid and hemimellitic anhydride. Trimellitic anhydride is the preferred acidic member.

The reaction requires the presence of an aliphatic polyol containing two or more hydroxy groups. Any of the well-known aliphatic polyols may be used such as alkylene glycols (including the ether glycols) glycerol, tetrahydroxy alcohols, and hexahydroxy alcohols. Examples of suitable aliphatic polyols are ethylene glycol, propylene glycol, hexamethylene glycol, diethylene glycol, triethylene glycol, glycerol, trimethylol-propane, erythritol, pentaerythritol, dipentaerythritol, mannitol and sorbitol. The alkylene glycols, and especially the lower glycols (containing 12 or less carbon atoms) are preferred polyols.

The reaction requires the presence of an aliphatic dicarboxylic acid containing at least 4 carbon atoms. Examples of suitable acids are succinic, glutaric, adipic, suberic, sebacic, maleic, itaconic, 1,6-hexene-3-dioic, linoleic-dimer, hexadecanedioic, eicosanedioic, hexacosanedioic and tetratriacontanedioic. The alkanedioic acids containing from 4 to about 20 carbon atoms are preferred.

In addition to the defined benzene tribasic acids, the defined aliphatic dicarboxylic acids and the defined aliphatic polyols, the resin polyester condensation reaction product may include an aliphatic monohydroxy alcohol. The aliphatic monohydroxy alcohols include, by way of example, methyl alcohol, butyl alcohol, hexyl alcohol, stearyl alcohol, allyl alcohol, and oleyl alcohol. In addition to the individual compounds, mixtures of these monohydroxy alcohols may be used, e.g., the mixtures obtained from the oxoation of a mixture of olefins. Such mixtures of oxo alcohols are now available commercially and are known as isooctyl alcohol, nonyl alcohol, isodecyl alcohol, and tridecyl alcohol.

The reaction may include an aliphatic polyols-benzoic acid ester containing two hydroxyl groups. Any of the well-known aliphatic polyols containing at least three hydroxyl groups may be used such as glycerol, tetrahydroxy alcohols, and hexahydroxy alcohols. Examples of such aliphatic polyols are glycerol, trimethylol-propane, erythritol, pentaerythritol, dipentaerythritol, mannitol, and sorbitol.

The ester is formed by reaction of the defined triol (etc.) and benzoic acid. The benzoic acid may be benzoic acid itself. The benzoic acid may contain alkyl substituents such as methyl, ethyl, etc. A particularly suitable acid is p-tert-butylbenzoic acid. Other substituents such as chloro groups may be present. It is preferred to utilize either benzoic acid itself or a benzoic acid containing an alkyl substituent having from 1–4 carbon atoms. Sufficient benzoic acid is utilized to react with hydroxyl groups present in the triol (etc.) in excess of two free-hydroxyl groups. It is preferred that the ester be preformed.

The reaction may also include a higher unsaturated fatty acid, i.e., one containing at least about 10 carbon atoms; preferably 16–24 carbon atoms. Illustrative are: Caproleic, lauroleic, myristoleic, palmitoleic, oleic, cetoleic, erucic, selacholeic, ximenic, 21-triacontanoic, sorbic, linoleic, eleostearic, linolenic. Also, the natural mixture of acids obtained from drying oils may be used, such as, linseed fatty acids, soya fatty acids, tung fatty acids, etc.

Instead of the defined fatty acid itself, a partial ester thereof may be used as a reactant. These may be obtained by the alcoholysis of a higher fatty oil with an alkane polyols having at least 3 hydroxyl groups. Any of the well-known alkane polyols containing at least three hydroxyl groups may be used, such as, glycerol, tetrahydroxy alcohols, and hexahydroxy alcohols. Examples of suitable polyols are glycerol, trimethylol-propane, erythritol, pentaerythritol, dipentaerythritol, mannitol, and sorbitol. For example, reacting linseed oil with glycerol. Or the partial ester may be made the direct reaction of the defined fatty with the defined polyol. It is preferred the partial ester contain 2 free-hydroxyl groups.

The polyester condensation reaction product desirably is prepared under conditions of reaction such that the resin has an Acid Number the lowest possible commensurate with avoiding gelation. In general, the acid number of the polyester product will be between about 20 and 150. (It is to be understood that not all combinations of the defined reactants can produce an acid number as low as 20, however.) The resin polyester products are soluble in oxygenated solvents such as alcohols and ketones and mixtures of these with benzene hydrocarbons.

The water soluble resin consists essentially of the resin produced by the reaction of the polyester condensation reaction product and an alkaline reacting material. The resin product and the alkaline material are reacted until a water soluble resin is obtained. The amount of alkaline reacting material is most readily determined by following the pH of the reaction medium. An aqueous reaction medium is preferred when the water soluble resinous product is to be used for surface coating applications because the desired water solution is obtained immediately. When the resin product and aqueous reaction medium are contacted in the presence of an alkaline reacting material, the resinous product passes into solution substantially completely at a pH of about 5. In practically all instances, the resin will be in complete solution at a pH of about 6. The use of alkaline reacting material in excess of that needed to bring all the resin into solution is not harmful, at least up to a water solution pH of about 8. It is preferred to have the aqueous solution somewhat on the acid side or neutral, i.e., a pH of from 6 to 7.

The alkaline reacting material may be any material which reacts with acidity to produce a more neutral product. Ammonia (as the hydroxide) and alkali metal hydroxides are particularly suitable when aqueous reaction medium is desired. The hydrocarbon amines, particularly the lower molecular weight containing not more than 4 carbon atoms in each aliphatic group, are suitable. The amine aliphatic alcohols, such as ethanolamines, are suitable. The heteroamines, such as morpholine, pyridine, and piperidine may be used. The type of alkaline reacting material used is determined in part by the characteristics desired in the final water soluble resin; also, by the type of resin product which is to be converted to a water soluble form.

The neutralization reaction is carried out by contacting the resin product and the alkaline reacting medium, when necessary in the presence of a liquid reaction medium; particularly suitable reaction mediums are oxygenated organic solvents and water. When water is used to the liquid reaction medium, it is preferred that it be warm, i.e., maintained in the region of 100–160° F.; the resin product is added to the aqueous alkaline reaction material and the two agitated until the resinous product has passed into solution. The water solutions of the water soluble resinous products are clear liquids usually containing some opalescent appearance; the solutions may be colorless or colored, depending on the particular water soluble resin present.

The water soluble resinous product, when exposed to oxygen or air at elevated temperatures, air-bake or cure to thermoset solids. At temperatures on the order of 400° F., the water soluble resin produces hard films on metal surfaces in times of 15 minutes to 1 hour.

In addition to their high solubility in water, which may be as much or more than 50 percent by weight, the water soluble resins are also soluble in the ordinary oxygenated organic solvents as well as in mixtures of these with benzene hydrocarbons.

Dispersed Component

The surface coating composition includes dispersed in the water-resin solution a plastic semisolid. This plastic semisolid is capable of forming a latex emulsion. Any of the polymers or copolymers now utilized in latex emulsion paints may be used to form the composition herein. Illustrative of these plastic semisolids are the rubber-like styrene-butadiene copolymers. The polyvinyl acetate latex emulsions: Polystyrene—both post- and pre-plasticized systems. Polymeric acrylic esters such as are derived from polymerization of methyl acrylate, ethyl acrylate, and methyl methacrylate. Emulsion copolymers of vinyl acetate and vinyl esters, such as vinyl benzoate, vinyl crotonate, and vinyl stearate. The grades of polyvinyl alcohol which can be dispersed in water.

Composition

The surface coating composition includes the water soluble resin, the plastic semisolid, and at least enough water to form the desired emulsion. In addition to these, other materials commonly used in latex emulsion paints may be present.

In general, the plastic semisolid component is present in an amount from 1 to 75 weight percent, based on said resin, but more or less may be present, dependent on the use to which the surface coating is to be put.

The defined acrylic emulsions improve the uniformity of films obtained from the water soluble resins; when used for this purpose, from 1–20 weight percent of these are present, based on resin.

Illustration

Trimellitic anhydride, adipic acid, and propylene glycol were placed in a flask provided with a stirrer and an overhead condenser separating water from glycol. Herein the mole ratio trimellitic:adipic:glycol was 3:1:7. The reactants were raised to 352° F. and cooked for a period of 7 hours with a sparge of nitrogen gas. The polyester resin product was a clear, yellowish solid having an acid number (mg. KOH/g.) of 48. The solid resin was dissolved in a 60:40 (by volume) mixture of xylene and butanol to obtain a 50% solution, i.e., 1 part by weight of resin for 2 parts by weight of solvent. The solution had a Gardner viscosity of J–K and a Gardner color of 3.

The solid resin was put into water solution by heating 355 g. of resin solids and 500 g. of distilled water to about 150° F. NH$_4$OH solution (28–30% NH$_3$) was added through a burette to neutralize the acid groups on the resin and thus effect solution. The pH of the mixture was kept between 5–6 throughout the reaction. The mixture thickened as the NH$_4$OH was added and it was necessary to add more water to keep the viscosity low. The resulting solution had the following properties: appearance—clear opalescent solution; viscosity—Z–5, Z–6 Gardner; percent solids—34.0%.

The solids of this water solution was obtained for examination by heating to 100° C. and sparging with a stream of nitrogen gas. The solid product was clear with a pale yellow cast and somewhat tacky at room temperature. The softening point was about 95°–110° F.

An enamel was prepared by milling in a modified jar mill 0.9 part of rutile, TiO$_2$, and 1 part of water soluble resin water solution (resin solids basis). The enamel was thinned with water and 1.5 mil dry film thickness, draw downs were made. These films were cured by baking 25 minutes at 400° F. The cured films were very glossy and had excellent physical properties. The Sward hardness of these films was 20. They were extremely tough and flexible; they passed a ⅛" bend (180°) without cracking and had an impact resistance of over 80 inch-lbs. The films exhibited an undesirable amount of cratering.

A commercial acrylic polymer emulsion was added to the enamel—12% by weight based on resin present. This acrylic emulsion had a solids content of 46 percent with particle sizes of less than one micron and a pH of 6–6.5. Baked films prepared from this enamel were practically free of craters and were commercially acceptable.

Thus having described the invention, what is claimed is:

1. A surface coating composition consisting essentially of (a) water, (b) a dispersed, plastic semisolid selected from the class consisting of styrene-butadiene copolymer, polyvinyl acetate polymer, vinyl acetate-vinyl (ester) copolymer, polymeric acrylic esters, and polystyrene, and (c) the water-soluble resinous reaction product of (I) an alkaline substance with (II) the polyester condensation reaction product of (1) a benzene tricarboxylic acidic member selected from the class consisting of trimellitic acid, trimellitic anhydride, trimesic acid, hemimellitic acid and hemimellitic anhydride, (2) an alkanedioic acid containing from 4 to about 20 carbon atoms, and (3) an alkylene glycol containing 2–12 carbon atoms, and said polyester having an acid number between about 20 and about 150, and is further characterized by the formation of a thermoset solid upon air-baking at a temperature on the order of 400° F. and solubility is water having a pH of between about 5 and 8.

2. The composition of claim 1 wherein said dispersed semisolid is a styrene-butadiene copolymer.

3. The composition of claim 1 wherein said dispersed semisolid is a polyvinylacetate polymer.

4. The composition of claim 1 wherein said dispersed semisolid is a polyacrylic ester polymer.

5. The water-soluble composition of claim 1 wherein said acidic member is trimellitic anhydride.

6. The water-soluble composition of claim 1 wherein said acid is adipic acid.

7. The water-soluble composition of claim 1 wherein said polyol is propylene glycol.

8. The water-soluble composition of claim 1 wherein said alkaline substance is ammonia.

9. The water-soluble composition of claim 1 wherein said alkaline substance is an alkanolamine.

10. The composition of claim 1 wherein said dispersed semi-solid is present in an amount from 1 to 75 weight percent, based on said polyester.

11. The composition of claim 1 wherein said dispersed semi-solid is an acrylic ester polymer and is present in an amount from 1 to 20 weight percent, based on said polyester.

References Cited in the file of this patent

UNITED STATES PATENTS

| | | |
|---|---|---|
| 2,285,646 | Clocker | June 9, 1942 |
| 2,470,953 | Robertson et al. | May 29, 1949 |
| 2,562,878 | Blair | Aug. 7, 1951 |
| 2,960,485 | Bolton et al. | Nov. 15, 1960 |